United States Patent [19]

Komura et al.

[11] Patent Number: 5,617,764

[45] Date of Patent: Apr. 8, 1997

[54] DRIVE DEVICE FOR POWER WORKING VEHICLE

[75] Inventors: Norio Komura; Tsuyoshi Yoshigasaki; Hiroshi Takahashi, all of Wako, Japan

[73] Assignee: Honda Giken Kogyo Kabushiki Kaisha, Tokyo, Japan

[21] Appl. No.: 332,752

[22] Filed: Nov. 1, 1994

[30] Foreign Application Priority Data

Nov. 2, 1993 [JP] Japan .................................. 5-274470
Nov. 12, 1993 [JP] Japan .................................. 5-283158

[51] Int. Cl.$^6$ .................................................. F16H 57/02
[52] U.S. Cl. .......................... 74/606 R; 475/83; 475/206
[58] Field of Search ........................... 74/606 R, 15.66; 475/83, 206

[56] References Cited

U.S. PATENT DOCUMENTS

| | | | |
|---|---|---|---|
| 3,309,943 | 3/1967 | Kosman et al. | 475/200 |
| 3,776,325 | 12/1973 | Jepersen | 180/6.48 |
| 4,756,208 | 7/1988 | Hayashi et al. | 74/606 R X |
| 4,784,013 | 11/1988 | Yamaoka et al. | 74/606 R |
| 4,856,368 | 8/1989 | Fujisaki et al. | 74/606 R |
| 4,862,767 | 10/1989 | Hauser | 74/687 |
| 4,922,787 | 5/1990 | Fujisaki et al. | 475/83 |
| 5,041,067 | 8/1991 | Hauser | 475/211 |
| 5,078,659 | 1/1992 | Von Kaler et al. | 475/78 |
| 5,125,291 | 6/1992 | Makita et al. | 475/83 |
| 5,156,576 | 10/1992 | Johnson | 475/72 |
| 5,195,933 | 3/1993 | Thoma et al. | 475/206 |
| 5,230,519 | 7/1993 | Nishimura et al. | 475/83 |
| 5,392,670 | 2/1995 | Hauser | 74/606 R |

FOREIGN PATENT DOCUMENTS 1-282026  11/1989  Japan .

*Primary Examiner*—Vinh T. Luong
*Attorney, Agent, or Firm*—Armstrong, Westerman, Hattori, McLeland & Naughton

[57] ABSTRACT

A drive device for a power working vehicle has a transmission case for a hydrostatic pressure type continuously variable transmission which includes a hydraulic pump and a hydraulic motor, the case having a narrow portion and a wide portion with a step being formed on one side of the transmission case. The hydrostatic pressure type continuously variable transmission is mounted to the narrow portion, so that it is accommodated within the height of the step. A differential is provided at the wide portion for differentially operating left and right axles, and a reducing gear mechanism extends from the narrow portion to the wide portion for transmitting an output from the continuously variable transmission to the differential through a multistage reduction. Thus, the output from the continuously variable transmission can be transmitted to the left and right axles through a reduction at a plurality of stages, and the structure of the drive device for the power working vehicle may be made simpler and more compact.

6 Claims, 13 Drawing Sheets

DRIVE DEVICE FOR POWER WORKING VEHICLE

BACKGROUND OF THE INVENTION

1. Field of the Invention

The present invention relates to a drive device for a power working vehicle, such as a power dolly, a snow plow and the like, and more particularly, to an improvement in a drive device for a power working vehicle, including a hydrostatic pressure type continuously variable transmission, comprising a hydraulic pump and a hydraulic motor, and a reducing gear mechanism for transmitting an output from the hydraulic motor to an axle.

2. Description of the Related Art

A drive device for a power working vehicle is already known, as disclosed, for example, in Japanese Patent Application Laid-open No. 282026/89. In the drive device disclosed in the above publication, a single axle is provided, and the motor shaft of the hydrostatic pressure type continuously variable transmission is disposed perpendicular to an axis of the axle.

The drive device, having the above-described structure, suffers from a problem in which the structure is complicated and the machinability and assemblability are degraded due to the fact that the motor shaft of the hydrostatic pressure type continuously variable transmission is perpendicular to the axis of the axle and, as a result, a bevel gear is used in the reducing gear mechanism connecting the motor shaft and the axle. If the above structure is to be applied to a drive device having a pair of left and right axles, requiring a differential means, an increase in size of the device is required due to the enlarged structure of a transmission case, thereby providing difficulty in mounting the drive device to a vehicle body.

SUMMARY OF THE INVENTION

Accordingly, it is an object of the present invention to provide a drive device for a power working vehicle, which is of a simple structure and has good machinability and assemblability and moreover, is compact, notwithstanding including a pair of left and right axles.

To achieve the above object, according to a first aspect and feature of the present invention, there is provided a drive device for a power working vehicle comprising: a transmission case, comprised of a wide portion, for carrying left and right axles, and a narrow portion, connected to the wide portion through a step, and dividable into two halves in an axial direction of the axles; a static hydraulic pressure type continuously variable transmission comprised of a hydraulic pump and a hydraulic motor and mounted to one side of the narrow portion, such that the variable transmission is accommodated substantially within the height of the step, and a motor shaft of the hydraulic motor is parallel to the axles; a differential means disposed on the wide portion and capable of differentially operating the left and right axles relative to each other; and, a reducing gear mechanism extending from the narrow portion to the wide portion for speed-reducing at a plurality of stages and transmitting an output from the motor shaft to the axles.

With the first feature, the transmission case comprises a wide portion, for carrying left and right axles, and a narrow portion, connected to the wide portion through the step, and the hydrostatic pressure type continuously variable transmission comprising a hydraulic pump and hydraulic motor, is mounted to one side of the narrow portion such that it is accommodated substantially within the height of the step. Therefore, the drive device can be constructed in a compact manner without the continuously variable transmission protruding from an outer side of the wide portion. Moreover, the reducing gear mechanism is disposed in the transmission case to extend from the narrow portion to the wide portion, and the differential means is contained in the transmission case. Therefore, the reducing gear mechanism, having a long transmitting path and capable of performing multi-stage speed reduction, and the wide differential means can be disposed rationally, which can contribute to further reduction in the size of the drive device. Further, the motor shaft of a continuously variable transmission is disposed in parallel with the axles, and the transmission case is constructed of two halves divided in the axial direction of the axles. Therefore, the reducing gear mechanism, connecting the hydraulic motor to the axles, can be entirely constructed of spur gears, and the machining and assembling of the transmission case and the reducing gear mechanism can be easily carried out.

In addition to the first feature, the drive device for the power working vehicle, according to the present invention, has a second feature in which the wide portion of the transmission case is constructed so that it can accommodate either a differential gear mechanism or a side clutch mechanism as the differential means.

With the second feature, the same transmission case can be used for any of the drive device, including the differential gear mechanism, and the drive device, including the side clutch mechanism, thereby permitting mass-production to reduce cost.

In addition to the first feature, the drive device for the power working vehicle, according to the present invention, has a third feature in which the drive device further comprises a transmitting ring which is coupled to an intermediate shaft of the reducing gear mechanism parallel to and adjacent the left and right axles to extend from one end toward the other end of the intermediate shaft and which is driven from an output shaft of the continuously variable transmission, a first clutch gear rotatably and slidably carried on the intermediate shaft, a clutch member coupled to the intermediate shaft, and a second clutch gear rotatably and slidably carried on the intermediate shaft, the four components being disposed in the named order on the intermediate shaft; and, wherein the differential means comprises a first dog clutch provided between the transmitting ring and the first clutch gear and brought into engaged and disengaged states in response to the reciprocal movement of the clutch gear, a second dog clutch provided between the clutch member and the second clutch gear and brought into engaged and disengaged states in response to the reciprocal movement of the clutch gear, and first and second driven gears normally meshed with the first and second clutch gears, respectively, and coupled to the left and right axles, respectively, and the continuously variable transmission is disposed adjacent one side of the side clutch mechanism where the intermediate shaft is located.

With the third feature, the transmission can be disposed by utilizing a wide space defined radially on one side of the side clutch mechanism and, hence, the drive device can be constructed in a compact manner.

In addition to the third feature, the drive device for the power working vehicle, according to the present invention, has a fourth feature in which the continuously variable transmission is mounted to an outer side of the transmission case for accommodating the reducing gear mechanism.

With the fourth feature, it is possible to provide further reduction in the size of the drive device and to separate the continuously variable transmission from the transmission case to conduct inspection and servicing thereof resulting in improved maintenance.

According to a fifth aspect and feature of the present invention, there is provided a drive device for a power working vehicle, comprising a pair of left and right static hydraulic pressure type continuously variable transmissions with their pump shafts connected to each other; and a reducing gear mechanism having two transmitting systems for individually reducing speed and transmitting outputs from motor shafts of the continuously variable transmissions to left and right axles. The drive device further includes a transmission case which is constructed from a first case half having a substantially flat outer side, and a second case half, connected to the first case half, and having an outer side including a step, the transmission case including a narrow portion and a wide portion which are bounded by the step. The left and right transmissions are mounted to opposite outer sides of the narrow portion, and the pump shafts of the left and right transmissions and are connected to each other within the narrow portion. The left and right axles, and an intermediate shaft, are carried on opposite sidewalls of the wide portion, the intermediate shaft being parallel to and adjacent one side of each of the left and right axles. The first transmitting system of the reducing gear mechanism comprises the intermediate shaft; an outer transmitting ring secured to the intermediate shaft to face the narrow portion and driven in a speed-reduction manner from the motor shaft of one of the continuously variable transmissions; a first final small gear connected to the intermediate shaft; and a first final large gear, secured to one of the axles, and meshed with the first final small gear. The second transmitting system of the reducing gear mechanism comprises an inner transmitting ring, rotatably carried on the intermediate shaft adjacent the inner side of the outer transmitting ring, to face the narrow portion and driven in a speed-reduction manner from the motor shaft of the other continuously variable transmission, a second final small gear rotatably carried on the intermediate shaft and connected to the inner transmitting ring, and a second final large gear fixedly mounted on the other axle and meshed with the second final small gear.

With the fifth feature, it is possible to reduce the dead space within the transmission case to construct the entire device in a compact manner. Moreover, a casting mold for at least one of the case halves can have substantially flat sidewalls, and thus has a simple shape, which contributes to a reduction in cost. The elements of two transmitting systems of the reducing gear mechanism are efficiently arranged on the intermediate shaft on the wide portion of the transmission case and can be disposed rationally to extend from the narrow portion to the wide portion so as to enable a multi-stage reduction.

In addition to the fifth feature, the drive device for the power working vehicle according to the present invention has a sixth feature that the two transmitting systems of the reducing gear mechanism are arranged to intersect each other on the intermediate shaft.

With the sixth feature, the two transmitting systems of the reducing gear mechanism can be disposed further rationally.

The above, and other objects, features and advantages of the invention, will become apparent from the following description of the preferred embodiments taken in conjunction with the accompanying drawings.

DESCRIPTION OF THE PREFERRED EMBODIMENTS

The present invention will now be described by way of embodiments in connection with the accompanying drawings.

Figure 1:
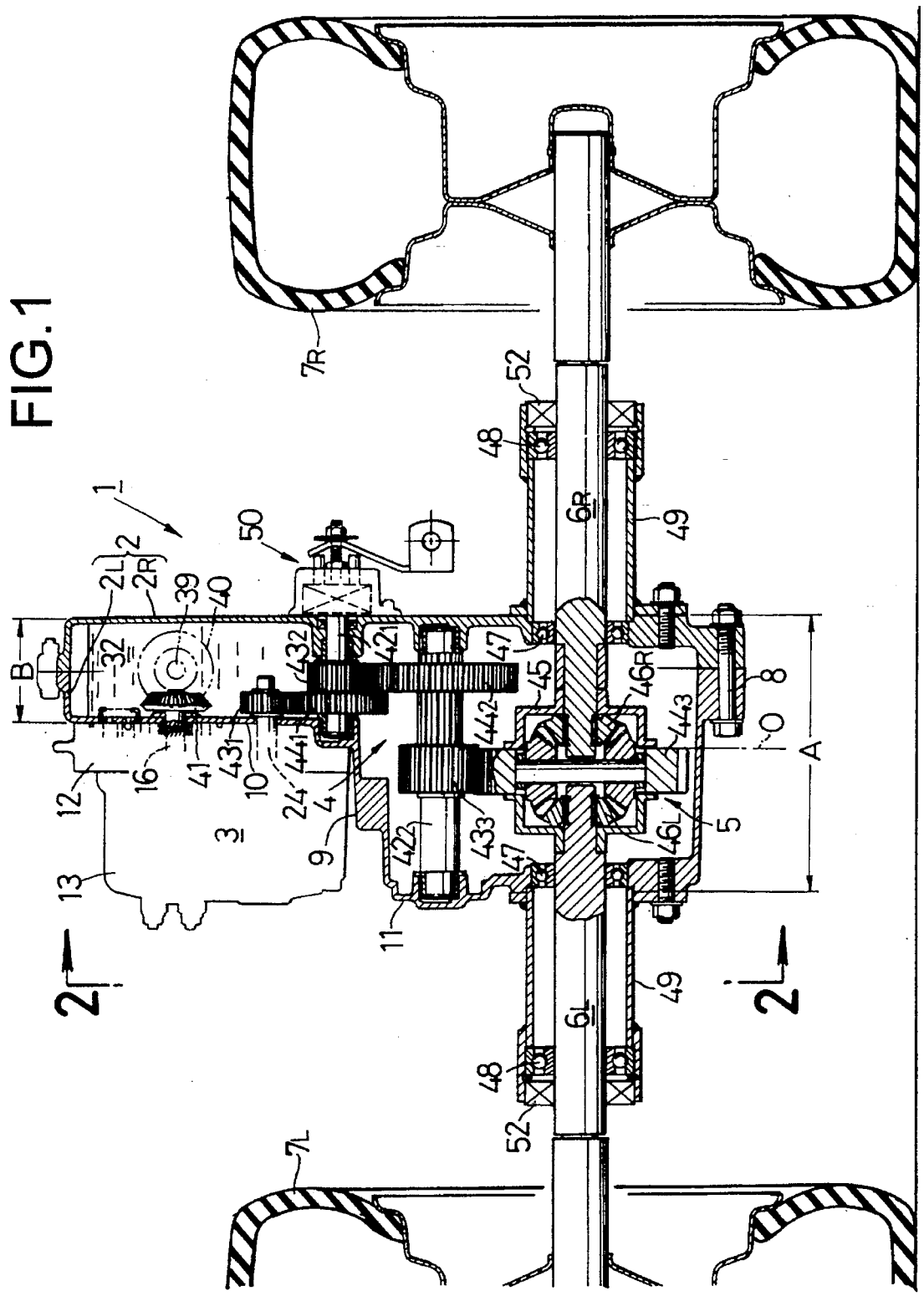
FIG. 1 is a sectional rear view taken along a vertical plane of a drive device for a power working vehicle according to a first embodiment of the present invention.
Figure 2:
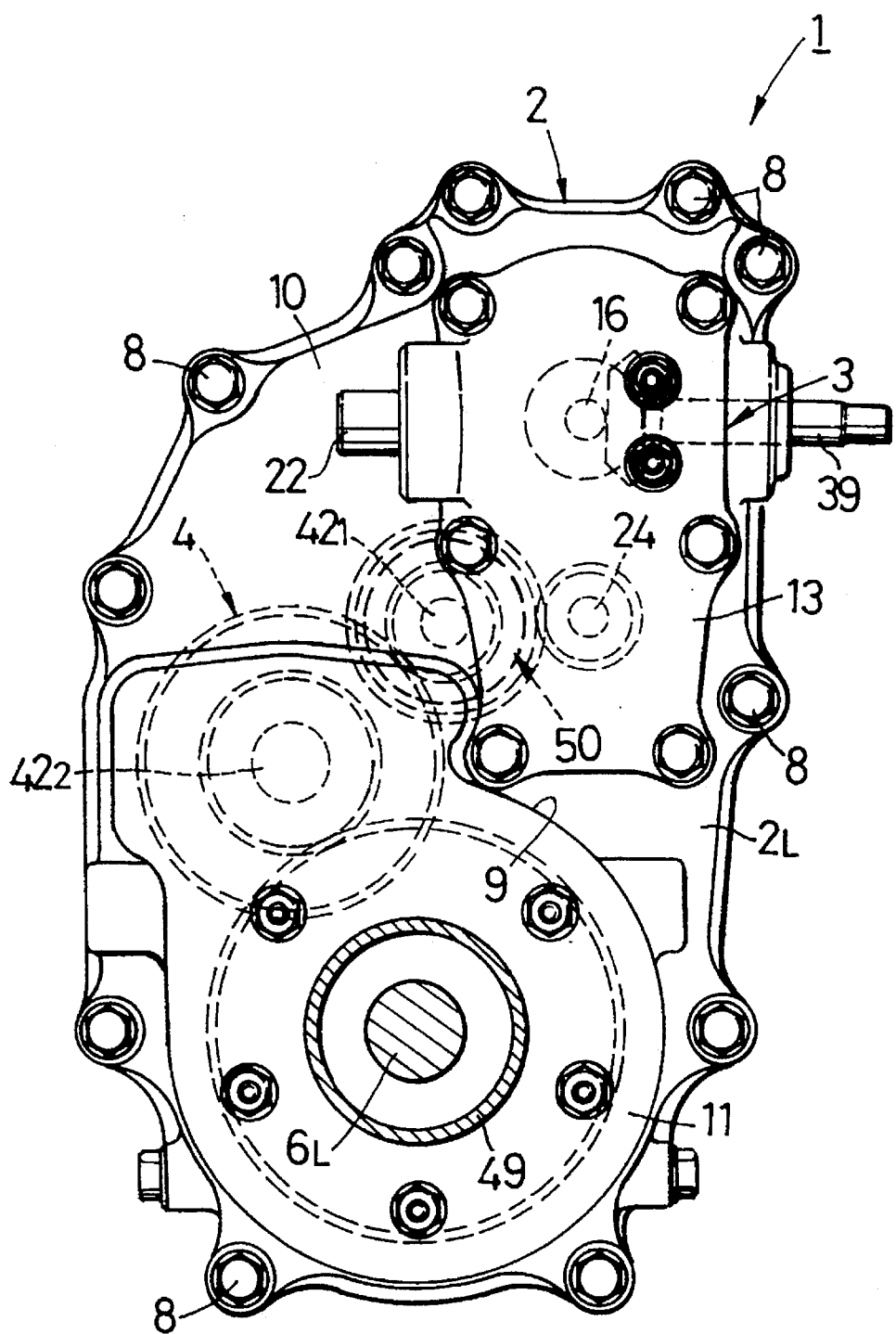
FIG. 2 is a sectional view taken along a line 2—2 in FIG. 1.

A first embodiment of the present invention shown in FIGS. 1 to 4 will first be described. Referring to FIGS. 1 and 2, a drive device 1 for a power working vehicle includes a transmission case 2, secured to a frame (not shown), a hydrostatic pressure type continuously variable transmission 3, mounted to a left side of the transmission case 2, a reducing gear mechanism 4 and a differential gear mechanism 5 (a differential means), both contained in the transmission case 2, and a pair of left and right axles $6_L$ and $6_R$ extending through left and right sidewalls of the transmission case 2, respectively. Left and right wheels $7_L$ and $7_R$ are detachably secured to outer ends of the axles $6_L$ and $6_R$, respectively.

The transmission case 2 includes left and right case halves $2_L$ and $2_R$, divided from each other on a plane perpendicular to the axles $6_L$ and $6_R$ and separatably coupled at their opened ends to each other by bolts 8. An outer side of the left case half $2_L$ protrudes outwardly, at its lower half, to a greater extent than its upper half to define a step 9 therebetween. In contrast, an outer side of the right case half $2_R$ is formed substantially flat all over. In this manner, the transmission case 2 includes a narrow portion 10 at its upper portion and a wide portion 11 at its lower portion, on opposite sides of the step 9. The width A of the wide portion 11 is set at a value at least 1.5 times, e.g., 2 times the width B of the narrow portion 10. The transmission case 2 is disposed with the center of the wide portion 11 substantially matched with a longitudinal center line O of the vehicle passing through a middle point between the left and right wheels $7_L$ and $7_R$, wherein the left side of the narrow portion 10 assumes a position slightly rightwardly offset from the longitudinal center line. The continuously variable transmission 3 is mounted to the left side of the narrow portion 10, so that it is accommodated substantially within the height of the step 9.

Figure 3:
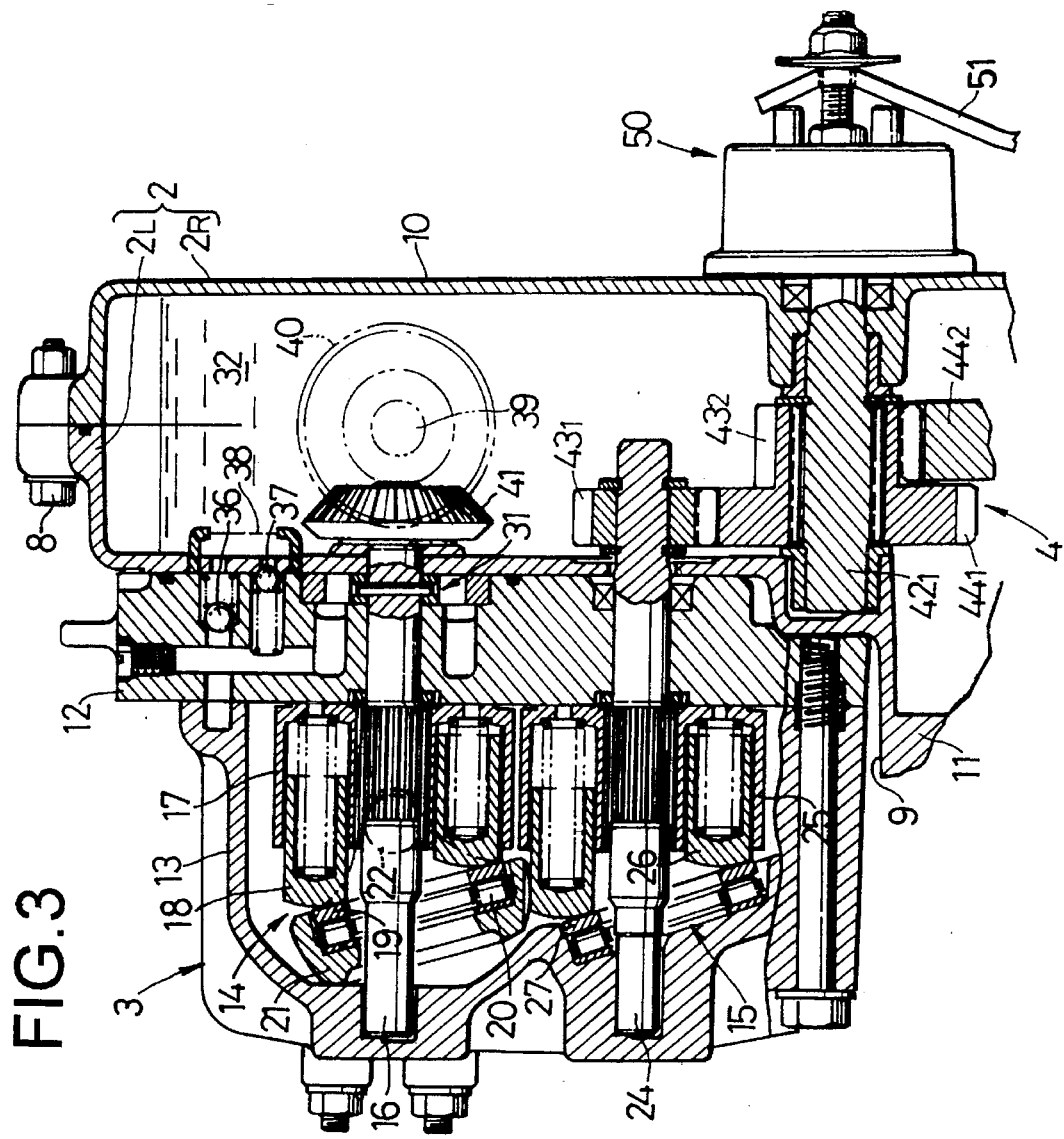
FIG. 3 is an enlarged side view of a hydrostatic pressure type continuously variable transmission shown in FIG. 1.

As shown in FIG. 3, the continuously variable transmission 3 includes a distributing plate 12, separatably coupled to the left side of the narrow portion 10 by bolts, a housing 13, coupled to the distributing plate 12 by bolts, and a hydraulic pump 14 and a hydraulic motor 15 both disposed within the housing 13. The hydraulic pump 14 comprises a pump shaft 16 extending through the distributing plate 12; a pump cylinder 17, spline-coupled to the pump shaft 16 to come into close contact with the distributing plate 12 for rotating and sliding movements; a large number of pump plungers 18, slidably received in the pump cylinder 17 in an annular arrangement around the pump shaft 16; a pump swash plate 19 in abutment against outer ends of the pump plungers 18; and a swash plate holder 21 for retaining a back of the pump swash plate 19 with a thrust bearing 20 interposed therebetween. The swash plate holder 21 is carried on the housing 13 through a pair of trunion shafts 22, having an axis perpendicular to an axis of the pump shaft 16, so as to enable the pump swash plate 19 to be tilted between one of maximally inclined positions (a forward TOP position) and the other maximally inclined position (a backward TOP position) through an upright position (a neutral position) perpendicular to the pump shaft 19.

On the other hand, the hydraulic motor 15 comprises a motor shaft 24, extending through the distributing plate 12; a motor cylinder 25, spline-coupled to the motor shaft 24 to come into close contact with the distributing plate 12 for rotating and sliding movements; a large number of motor plungers 26, slidably received in the motor cylinder 25 in an annular arrangement around the motor shaft 24; and a motor swash plate 27 in abutment against outer ends of the motor plungers 26. A back of the motor swash plate 27 is carried on the housing 13 with a thrust bearing 20 interposed therebetween in a state in which it is inclined at a predetermined angle with respect to the motor shaft 24.

Figure 4:
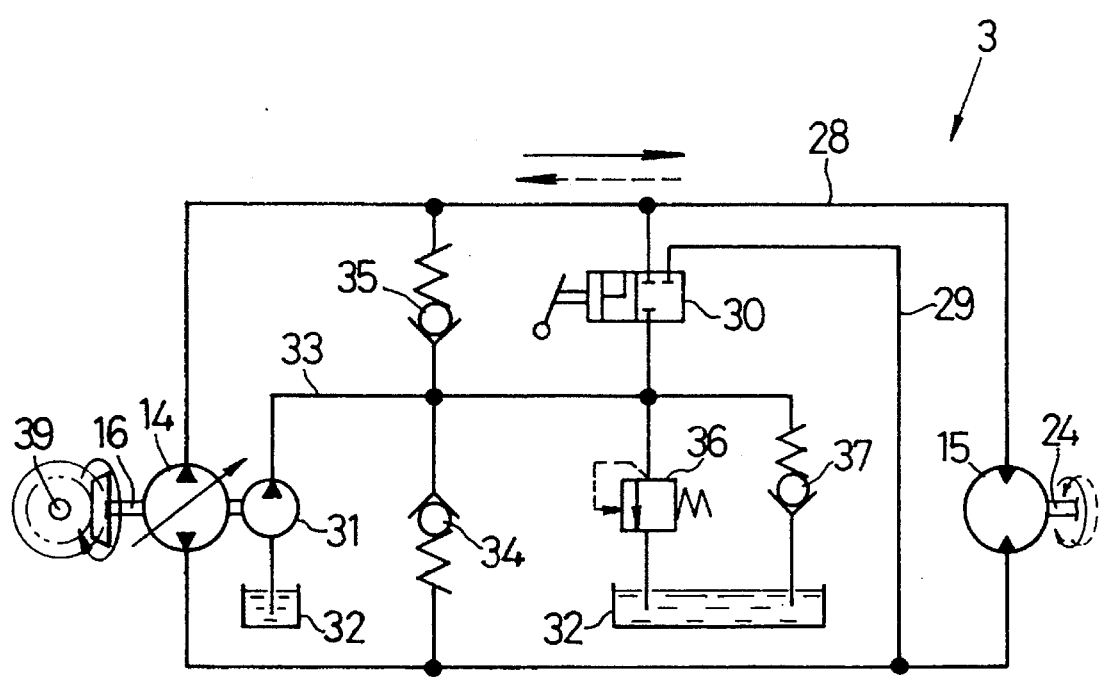
FIG. 4 is a schematic diagram of a hydraulic circuit of the continuously variable transmission.

In the continuously variable transmission 3, the hydraulic pump 14 and the hydraulic motor 15 are connected to each other by a closed hydraulic circuit 28, as shown in FIG. 4. If required, a bypass passage 29 may be provided in the hydraulic closed circuit 28 to connect a higher pressure side and a lower pressure side of the hydraulic closed circuit 28. In this case, a release valve 30 is incorporated in the bypass passage 29 and is manually opened and closed. A working oil supply pump 31 is connected to the hydraulic pump 14 and is driven by the pump shaft 16 of the hydraulic pump 14. The working oil supply pump 31 is intended to pump a working oil from an oil reservoir 32 into an oil supply passage 33 which is connected to the higher and lower pressure-sides of the hydraulic closed circuit 28 through one-way valves 34 and 35, respectively. If necessary, the oil supply passage 33 may be connected to the oil reservoir 32 through a relief valve 36 and an intake valve 37 which are disposed in parallel with each other.

Thus, if the hydraulic pump 14 is driven with the pump swash plate 19, inclined in a forward direction when the release valve 30 is in a closed state, the working oil is permitted to flow in the hydraulic closed circuit in a direction indicated by a solid-line arrow, thereby causing the motor shaft 24 of the hydraulic motor 15 to be rotated in a normal direction at a shift ratio provided by the ratio between the displacements of the hydraulic pump 14 and the hydraulic motor 15 at that time. Conversely, if the pump swash plate 19 is inclined in a backward direction, the working oil is permitted to flow in the closed hydraulic circuit in a direction indicated by a dotted-line arrow, thereby rotating the motor shaft 24 in a reverse direction. If a leakage of the oil occurs in the hydraulic closed circuit 28 during this time, the one-way valve 34, or 35, corresponding to the current lower pressure side, is opened, thereby permitting the working oil to be supplemented from the working oil supply pump 31 to the hydraulic closed circuit 28. When the pressure in the oil supply passage 33 rises to a given value or greater, the relief valve 36 is opened to prevent an excessive rise in the pressure in the oil supply passage 33. When the higher and lower pressure sides in the hydraulic closed circuit 28 are reversed suddenly from each other by an engine brake and the supplement of the working oil to the lower pressure side by the working oil supply pump 31 is insufficient, the intake valve 37 can be opened to permit the oil in the oil reservoir 32 to be drawn into such lower pressure side, thereby preventing the suction of air into the hydraulic closed circuit 28.

Referring again to FIG. 3, the hydraulic closed circuit 28, the working oil supply pump 31, the oil supply passage 33, the one-way valves 34 and 35, the relief valve 36, and the intake valve 37 are provided in the distributing plate 12. The hydraulic closed circuit 28 and the one-way valves 34 and 35 are not shown in FIG. 3.

The oil reservoir 32 is defined between case halves $2_L$ and $2_R$ of the transmission case 2. An oil filter 38 is mounted inside the distributing plate 12 and immersed into the oil reservoir 32 to cover intake ports of the working oil supply pump 31 and the intake valve 37 for filtering the working oil to be supplied to working oil supply pump 31 and intake valve 37.

The pump shaft 16 and the motor shaft 24 are both disposed parallel to the axles $6_L$ and $6_R$. The pump shaft 16 has one end protruding into the narrow portion 10 of the transmission case 2, and bevel gears 40 and 41 are secured to such one end and a front end of an input shaft 39 passing through a rear wall of the narrow portion 10 and are meshed with each other to connect such ends. The input shaft 39 is connected to an engine (not shown) through a clutch (not shown) or directly connected to the engine through a belt, joint or the like.

The motor shaft 24 also has one end protruding into the narrow portion 10, such one end being connected to the differential gear mechanism 5 through the reducing gear mechanism 4.

As shown in FIGS. 1 and 3, the reducing gear mechanism 4 comprises first and second intermediate shafts $42_1$ and $42_2$, rotatably carried on the narrow and wide portions 10 and 11 of the transmission case 2 parallel to the axles $6_L$ and $6_R$, respectively, a first small gear $43_1$ secured to the one end of the motor shaft 24, a first large gear $44_1$ secured to the first intermediate shaft $42_1$ and meshed with the first small gear $43_1$, a second small gear $43_2$ integral with the first large gear $44_1$, a second large gear $44_2$ secured to the second intermediate shaft $42_2$ and meshed with the second small gear $43_2$, a third gear $43_3$ likewise secured to the second intermediate shaft $42_2$, and a third large gear $44_3$ secured to case 45 of the differential gear mechanism 5 and meshed with the third small gear $43_3$, so that the rotation of the motor shaft 24 is reduced at three stages and transmitted to the differential gear mechanism 5.

The differential gear mechanism 5 is of a conventionally known structure, and includes output gears $46_L$ and $46_R$, to which inner ends of the left and right axles $6_L$ and $6_R$ are coupled, respectively. The axles $6_L$ and $6_R$ are carried by inner bearings 47, mounted to left and right opposite sidewalls of the wide portion 11 of the transmission case 2, and by outer bearing 48, each mounted to an outer end of a cylindrical axle case 49 connected to such opposite sidewalls. An oil seal 52 is mounted to the axle case 49 adjacent the exterior of the outer bearing 48.

As shown in FIG. 1, a right end of the first intermediate shaft $42_1$ protrudes outwardly of the transmission case 2, and a brake device 50 is mounted to this right end and is capable of applying a braking force from a turning operation of a brake level 51.

The operation of this embodiment will be described below. When power from the engine (not shown) is transmitted through the input shaft 39 to the pump shaft 16, the power is transmitted through the reducing gear mechanism 4 to the differential gear mechanism 5 after proper gear-shifting, by the continuously variable transmission 3, and is distributed therein to the left and right axles $6_L$ and $6_R$ and transmitted to the wheels $7_L$ and $7_R$ to drive the latter.

In such drive device 1 for a power working vehicle, the narrow and wide portions 10 and 11 of the transmission case 2 form the step 9 on one side of the transmission case 2, and the continuously variable transmission 3 is mounted to one side of the narrow portion 10 so as to be substantially accommodated within the height of the step 9. Therefore, the entire drive device 1 can be constructed in a compact manner, and the continuously variable transmission 3 can be removed from the transmission case 2 and inspected and serviced, alone.

Moreover, the reducing gear mechanism 4 extends from the narrow portion 10 to the wide portion 11 in the transmission case 2, and the differential gear mechanism 5 is disposed at the wide portion 11 of the transmission case 2. Therefore, the reducing gear mechanism 4, having a long transmitting path and capable of performing a multi-stage reduction, and the wide differential gear mechanism 5 can be accommodated in a rational manner. This also contributes to the compact size of the drive device.

The pump shaft 16 and the motor shaft 24 of the continuously variable transmission 3, as well as the first and second intermediate shafts $42_1$ and $42_2$ of the reducing gear mechanism 4, are all disposed parallel to the axles $6_L$ and $6_R$. Moreover, the transmission case 2 is divided into two parts in axial direction of the axles $6_L$ and $6_R$. Therefore, all the reducing gear mechanism 4 can be simply constructed of spur gears, leading to improved machinability and ease of assembly.

Figure 5:
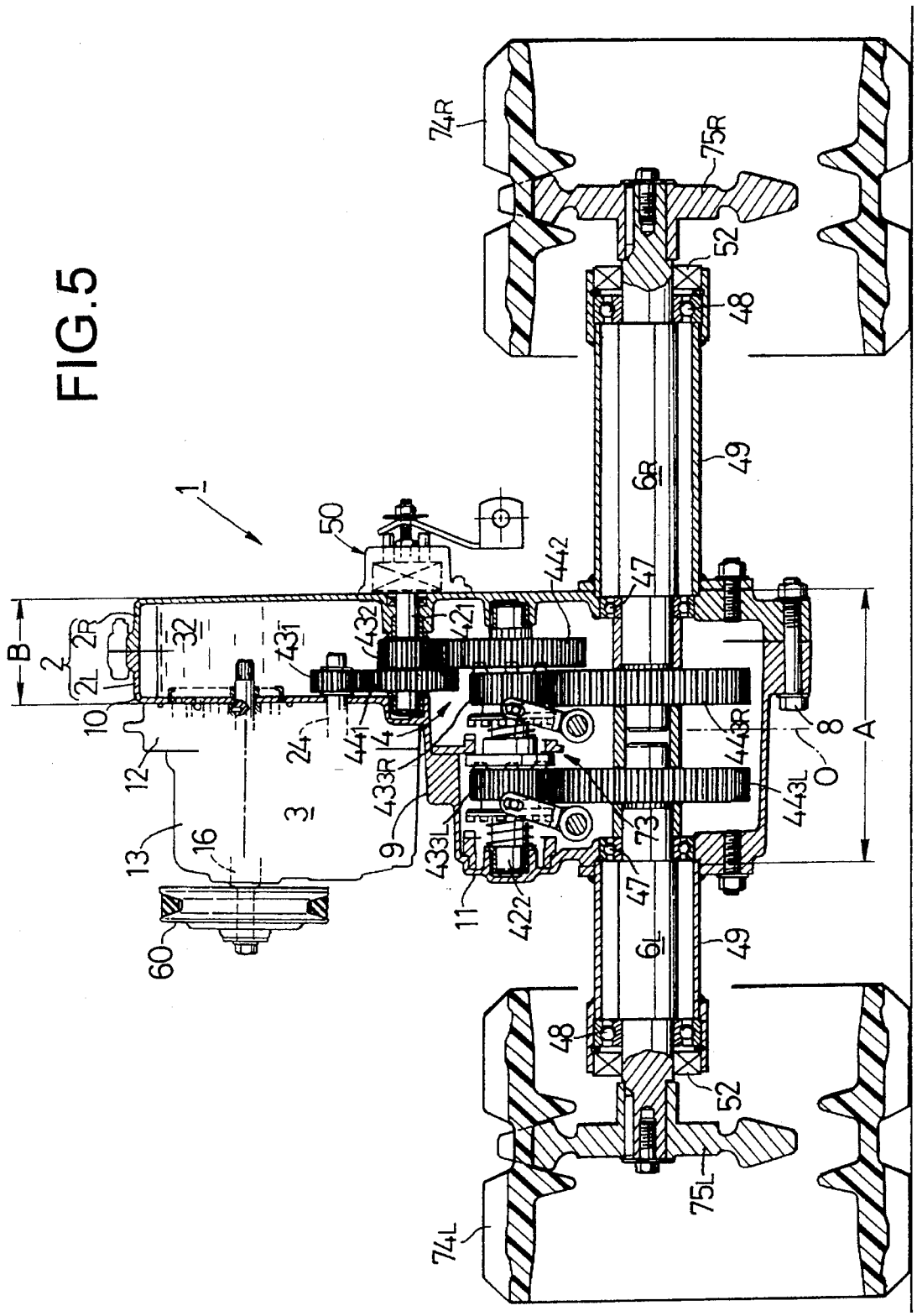
FIG. 5 is a sectional rear view taken along a vertical plane, similar to FIG. 1, illustrating a second embodiment of the present invention.
Figure 6:
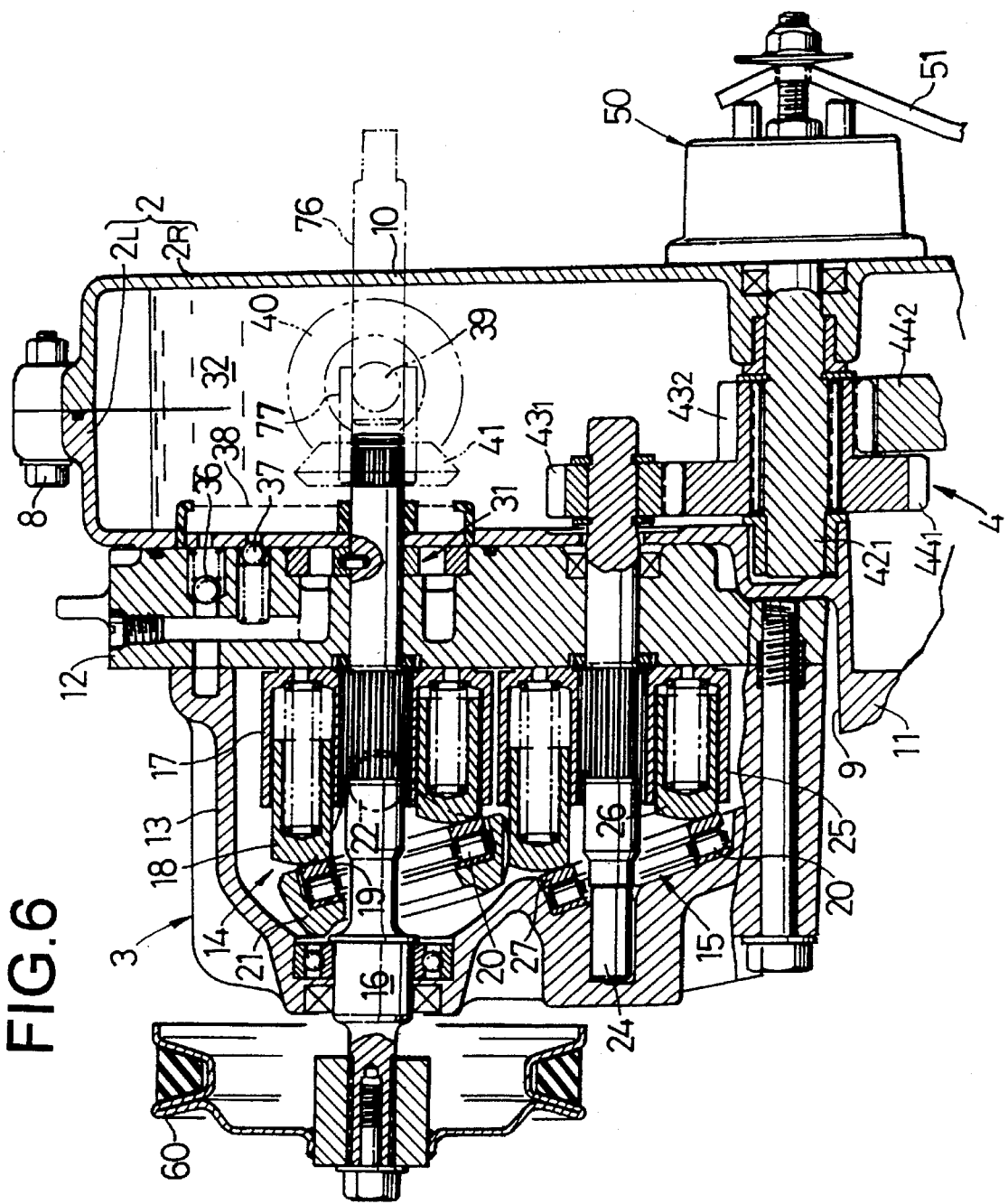
FIG. 6 is an enlarged view of a hydrostatic pressure type continuously variable transmission shown in FIG. 5 and portions thereground.
Figure 7:
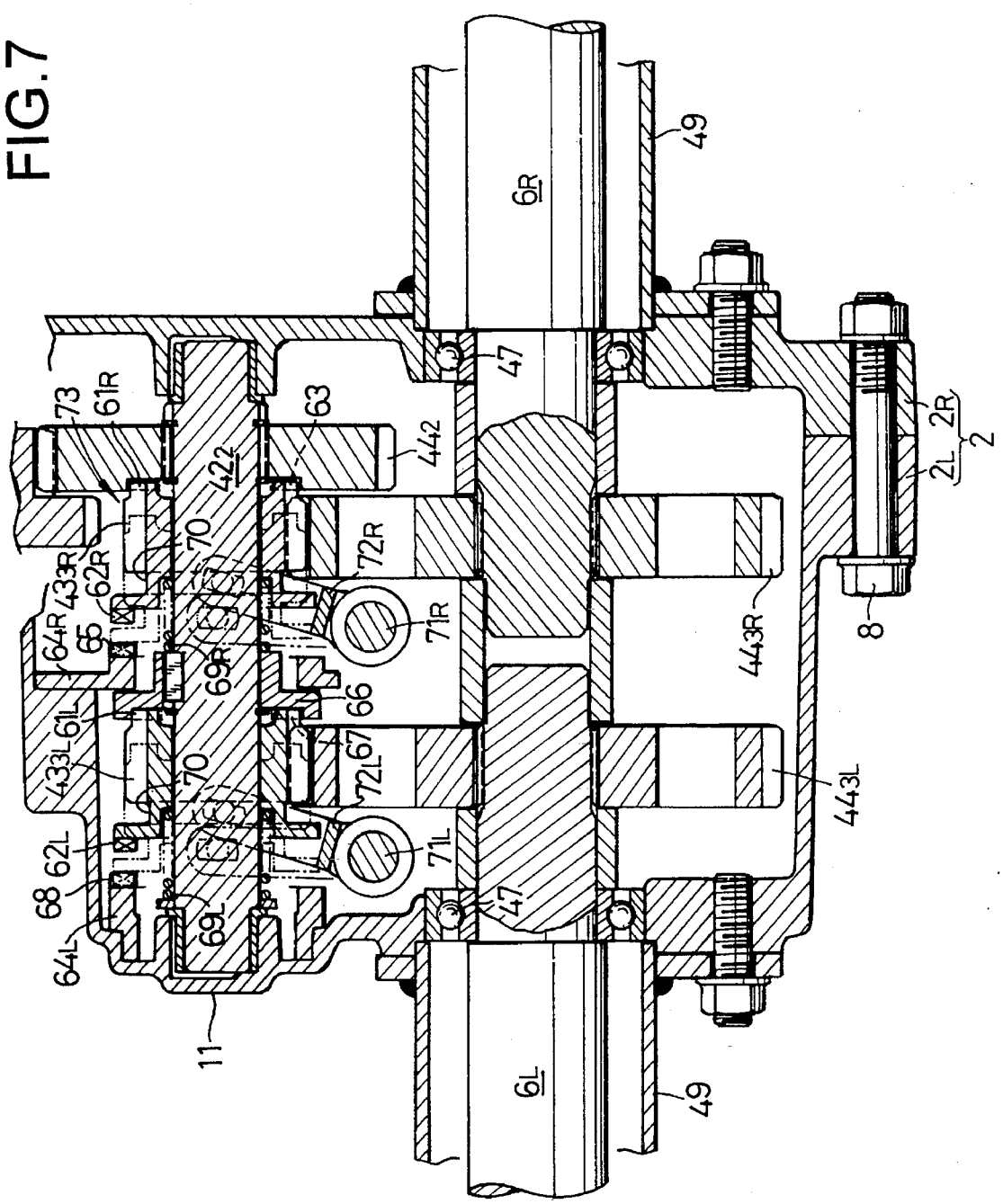
FIG. 7 is an enlarged view of a differential means and portions thereground.

A second embodiment of the present invention will now be described in connection with FIGS. 5 to 7. An outer end of a pump shaft 16 of a continuously variable transmission 3 protrudes outwardly of a housing 13, and an input pulley 60 is secured to such outer end and driven by a belt from an engine (not shown). An inner end of the pump shaft 16 protrudes into a transmission case 2, as in the first embodiment, so that the pump shaft 16 can be driven from the engine through an input shaft 39 and bevel gears 40 and 41. Alternatively, the pump shaft 16 may be driven through a joint 77 from an input shaft 76 passing through the right case half $2_R$. The same transmission case 2 as described in the first embodiment is used.

A pair of left and right third small gears $43_{3L}$ and $43_{3R}$ are rotatably and slidably carried on a second intermediate shaft $42_2$ of a reducing gear mechanism 4, and a pair of third large gears $44_{3L}$ and $44_{3R}$ are key-coupled, or spline-coupled, to left and right axles $6_L$ and $6_R$ and are meshed with small gears $43_{3L}$ and $43_{3R}$.

The third small gears $43_{3L}$ and $43_{3R}$ are provided at right ends thereof (FIG. 7) with clutch claws $61_L$ and $61_R$, respectively, and at left ends thereof brake claws $62_L$ and $62_R$. The right third small gear $43_{3R}$ is formed to cause the clutch claw $61_R$ to be brought into engagement with a clutch claw 63 of the second large gear $44_2$, when such small gear $43_{3R}$ is moved rightwardly, and to cause the brake claw $62_R$ to be brought into engagement with a brake claw 65 of a right brake member $64_R$ secured to the transmission case 2, when such small gear $43_{3R}$ is moved leftwardly. The left third small gear $43_{3L}$ is formed to cause the clutch claw $61_L$ to be brought into engagement with a clutch claw 67 of a drive plate 66 secured to the second intermediate shaft $42_2$, when such small gear $43_{3L}$ is moved rightwardly, and to cause the clutch claw $62_L$ to be brought into engagement with a brake claw 68 of a left brake member $64_L$ secured to the transmission case 2, when such small gear $43_{3L}$ is moved leftwardly. This third small gears $43_{3L}$ and $43_{3R}$ are biased by springs $69_L$ and $69_R$ in a direction to engage the second large gear $44_2$ and the drive plate 66, and $71_R$ to engage outer peripheral grooves 70, 70 in the third small gears $43_{3L}$ and $43_{3R}$ respectively.

Shift forks $72_L$ and $72_R$ are secured to a pair of left and right operating shafts $71_L$ and $71_R$ to engage outer peripheral grooves 70, 70 in the third small gears $43_{3L}$ and $43_{3R}$. The operating shafts $71_L$ and $71_R$ extend through a front wall of the transmission case 2 and are connected to an operating wire. If the shift forks $72_L$ and $72_R$ are swung through the operating shafts $71_L$ and $71_R$, by operating the operating wire, the corresponding third small gears $43_{3L}$ and $43_{3R}$ can be shifted laterally.

The third small gears $43_{3L}$ and $43_{3R}$, forming a portion of the reducing gear mechanism 4, constitute a side clutch device 73 (a differential means) which is capable of differentially operating the axles $6_L$ and $6_R$ in cooperation with the left and right shift forks $72_L$ and $72_R$.

Crawler drive wheels $75_L$ and $75_R$ are secured to outer ends of the left and right axles $6_L$ and $6_R$ for driving left and right crawlers $74_L$ and $74_R$, respectively.

The rest of the arrangement is the same as in the first embodiment, and part or components corresponding to those in the first embodiment are designated by like reference characters.

In the second embodiment, whenever the left and right third small gears $43_{3L}$ and $43_{3R}$ are at their right movement limits, causing the engagement of the clutch claws $61_L$ and $61_R$ with the respective clutch claws 63 and 67 of the second large gear $44_2$ and the drive plate 66, power transmitted from the continuously variable transmission 3 to a second large gear $44_2$ is transmitted from the right third small gear $43_{3R}$ and, at the same time, also transmitted from the left third small gear $43_{3L}$, through the second intermediate shaft $42_2$ and the drive plate 66 to the left third large gear $44_{3L}$, to simultaneously drive the left and right axles $6_L$ and $6_R$, so that the vehicle can be advanced straight ahead.

If, for example, the right operational shaft $71_R$ is operated to move only the right third small gear $43_{3R}$ leftwardly, to release the engagement with the second large gear $44_2$, the transmission of the power to the right axle $6_R$ is cut off and, hence, the vehicle is turned in a clockwise direction by a torque of the left axle $6_L$.

If the right third small gear $43_{3R}$ is further shifted to its left movement limit to engage the brake member $64_R$, the free rotation of the right third small gear $43_{3R}$ is inhibited and, hence, the radius of clockwise turning movement of the vehicle can be reduced.

If the left operating shaft $71_L$ is operated to move only the left third small gear $43_{3L}$ leftwardly, the vehicle can be turned in a counterclockwise direction in the same manner as that described above.

If both the left and right operating shafts $71_L$ and $71_R$ are operated simultaneously to move both the left and right third small gears $43_{3L}$ and $43_{3R}$ leftwardly, the transmission of the power to the left and right axles $6_L$ and $6_R$ can be simultaneously blocked and, further, the free rotation of the axles $6_L$ and $6_R$ can be inhibited to maintain the vehicle in its stopped state.

In such drive device 1 for a power working vehicle, the second large gear $44_2$, driven from the side of the continuously variable transmission 3, is secured to the right end of the second intermediate shaft $42_2$ carried on the wide portion 11 of the transmission case 2 adjacent the step 9, i.e., the end adjacent the narrow portion 10, and the right third small gear $43_{3R}$, the clutch member (or drive plate) 66, and the left third small gear $43_{3L}$ are provided on the second intermediate shaft $42_2$ in the named order, in the leftward direction. Dog clutches are provided between the second large gear $44_2$ and the right third small gear $43_{3R}$, and between the clutch member 66 and the left third small gear $43_{3L}$. In this manner, the side clutch device 73 is constructed around the second intermediate shaft $42_2$. Therefore, it is possible to dispose the continuously variable transmission 3 on one side of the side clutch device 73, adjacent the second intermediate shaft $42_2$, with the step 9 of the transmission case 2 located therebetween, which contributes to the compact size of the drive device 1.

It will be understood that various modifications in design to the above-described embodiments can be made without departing from the spirit and scope of the invention defined in the claims. For example, a step 9 may be formed on the right side of the transmission case 2 to mount the continuously variable transmission 3 to the right side of the narrow portion 10; a brake device for the axles $6_L$ and $6_R$ may be disposed on the wide portion 11; and the transmission case 2 may be inclined forwardly or backwardly around the axles $6_L$ and $6_R$, or in a tilted-down layout.

Finally, a third embodiment of the present invention will now be described in connection with FIGS. 8 to 13.

Figure 8:
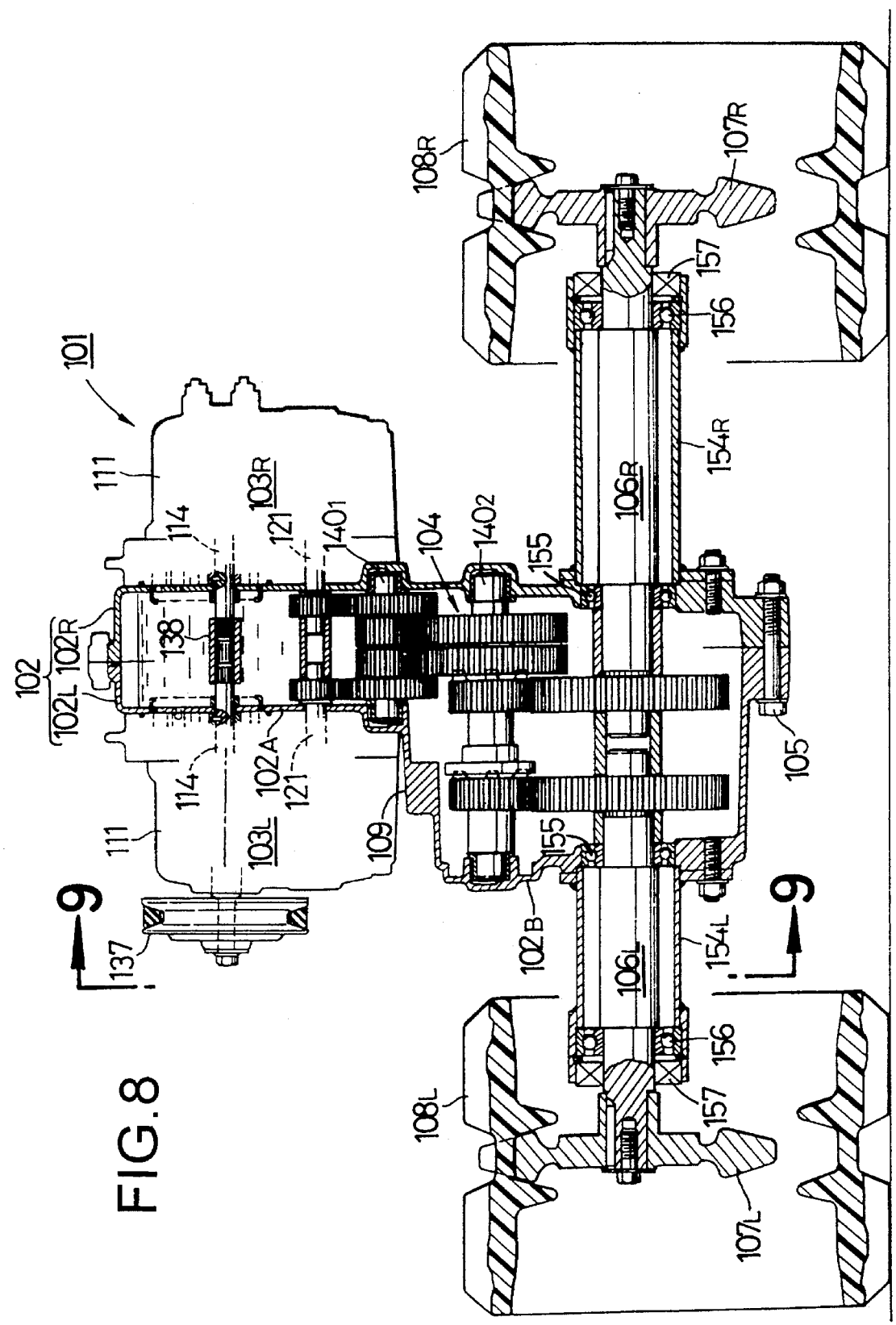
FIG. 8 is a sectional rear view taken along a vertical plane of a drive device for a power working vehicle according to a third embodiment of the present invention.
Figure 9:
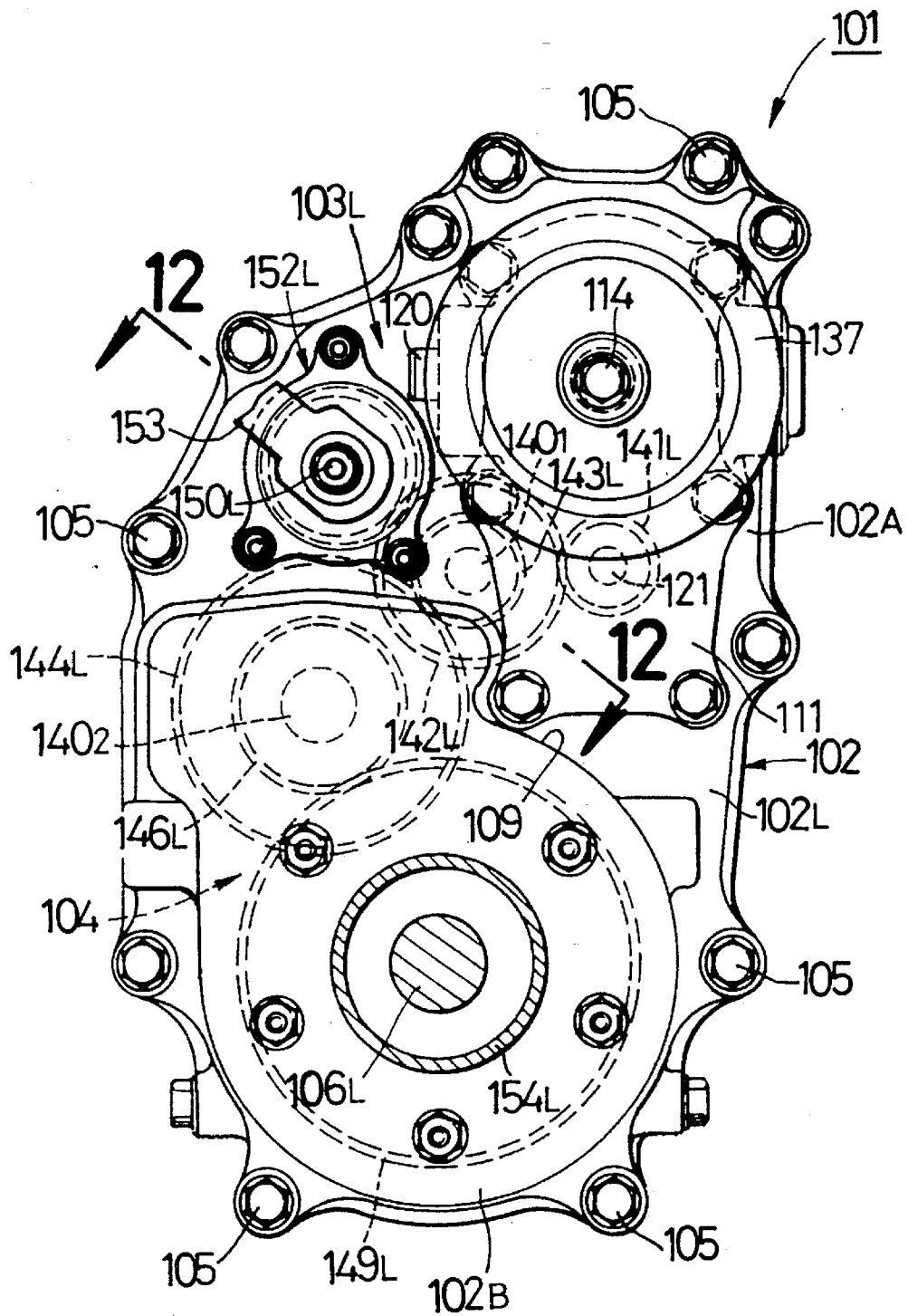
FIG. 9 is a sectional side view taken along a line 9—9 in FIG. 8.

Referring first to FIGS. 8 and 9, a drive device 101 for a power working vehicle includes a transmission case 102 secured to a vehicle body frame (not shown), a pair of hydrostatic pressure type continuously variable transmissions $103_L$ and $103_R$ mounted to left and right sides of the transmission case 102, respectively, and, a pair of axles $106_L$ and $106_R$ extending through left and right sidewalls of the transmission case 102, respectively. Driving wheels $107_L$ and $107_R$, for left and right crawlers $108_L$ and $108_R$, are mounted on outer ends of the axles $106_L$ and $106_R$, respectively.

The transmission case 102 is comprised of left and right case halves $102_L$ and $102_R$, divided from each other in a plane perpendicular to axes of the axles $106_L$ and $106_R$, and separatably coupled, at their opened ends, to each other by bolts 105. An outer side of the left case half $102_L$ protrudes outwardly, at its lower half, to a greater extent than its upper half to form a step 109 therebetween. Conversely, an outer side of the right case half $102_R$ is formed to be substantially flat all over. In this manner, the transmission case 102 includes a narrow portion $102_A$, at its upper portion, and a wide portion $102_B$, at its lower portion, on opposite sides of the step 109. The pair of continuously variable transmission $103_L$ and $103_R$ are mounted to left and right sides of the narrow portion $102_A$.

The left and right axles $106_L$ and $106_R$ are carried by inner bearings 155, mounted to left and right opposite sidewalls of the wide portion $102_B$ of the transmission case 102, and by outer bearings 156, mounted to outer ends of cylindrical axle cases $154_L$ and $154_R$ connected to such opposite sidewalls. An oil seal is mounted to each of axles cases $154_L$ and $154_R$ adjacent the outer bearings 156.

Figure 10:
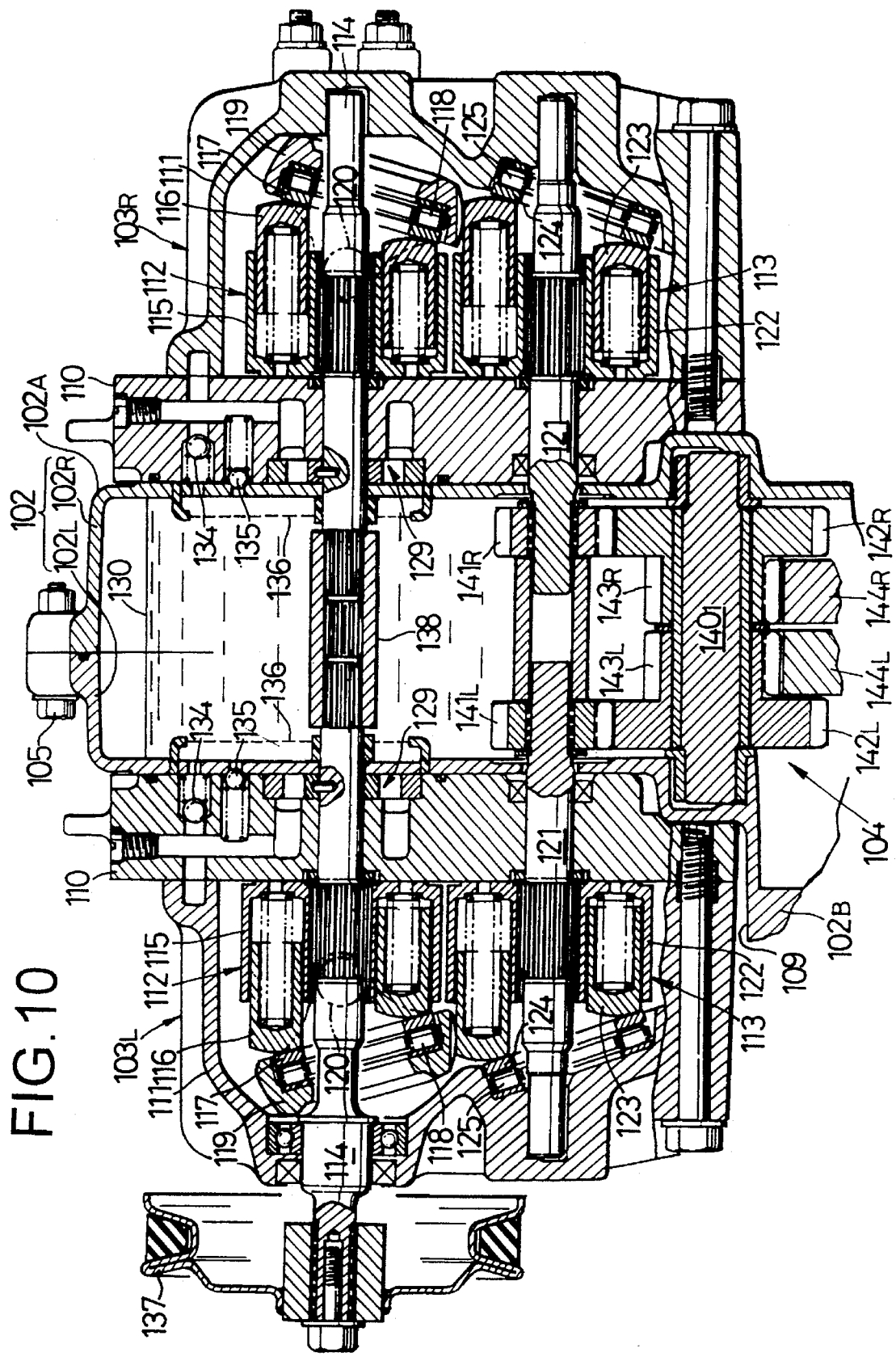
FIG. 10 is an enlarged vertical sectional view of left and right hydrostatic pressure type continuously variable transmissions shown in FIG. 8 and portions thereground.

As shown in FIGS. 9 and 10, the left and right continuously variable transmissions $103_L$ and $103_R$ are of the same structure and are symmetrically disposed. Each of the continuously variable transmissions $103_L$ and $103_R$ includes a distributing plate 110, separatably coupled to an outer side of the same-side case half $102_L$ and $102_R$ by bolts, a housing 111 coupled to the distributing plate 110 by bolts, and a hydraulic pump 112 and a hydraulic motor 113 which are disposed within the housing 111. The hydraulic pump 112 is comprised of a pump shaft 114, extending through the distributing plate 110, a pump cylinder 115 spline-coupled to the pump shaft 114 to come in close contact with the distributing plate 110 for rotating and sliding movements, a large number of pump plungers 116, slidably received in the pump cylinder 115 in an annular arrangement around the pump shaft 114, a pump swash plate 117, in abutment against outer ends of the pump plungers 116, and a swash plate holder 119, for retaining a back of the pump swash plate 117 through a thrust bearing 118. The swash plate holder 119 is carried on the housing 111 with a pair of trunion shafts 120 interposed therebetween, with their axes perpendicular to an axis of the pump shaft 114, so that the pump swash plate 117 can be tilted between a first maximally inclined position (a forward TOP position) and a second maximally inclined position (a backward TOP position) through an upright position (a neutral position) perpendicular to the pump shaft 114. A shift lever (not shown) is secured to an outer end of the trunion shaft 120 of each of the left and right swash plate holders 119, so that the angle of the pump swash plate 117 can be adjusted by turning the shift lever.

On the other hand, the hydraulic motor 113 is comprised of a motor shaft 121 extending through the distributing plate 110, a motor cylinder 122 spline-coupled to the motor shaft 121 to come into close contact with the distributing plate 110 for rotating and sliding movements, a large number of motor plungers 123 slidably received in the motor cylinder 122 in an annular arrangement around the motor shaft 121, and a motor swash plate 124 in abutment against outer ends of the motor plungers 123. A back of the motor swash plate 124 is carried on the housing 111 with a thrust bearing 125 interposed therebetween, in a state in which such swash plate 124 is inclined at a predetermined angle with respect to the motor shaft 121.

Figure 13:
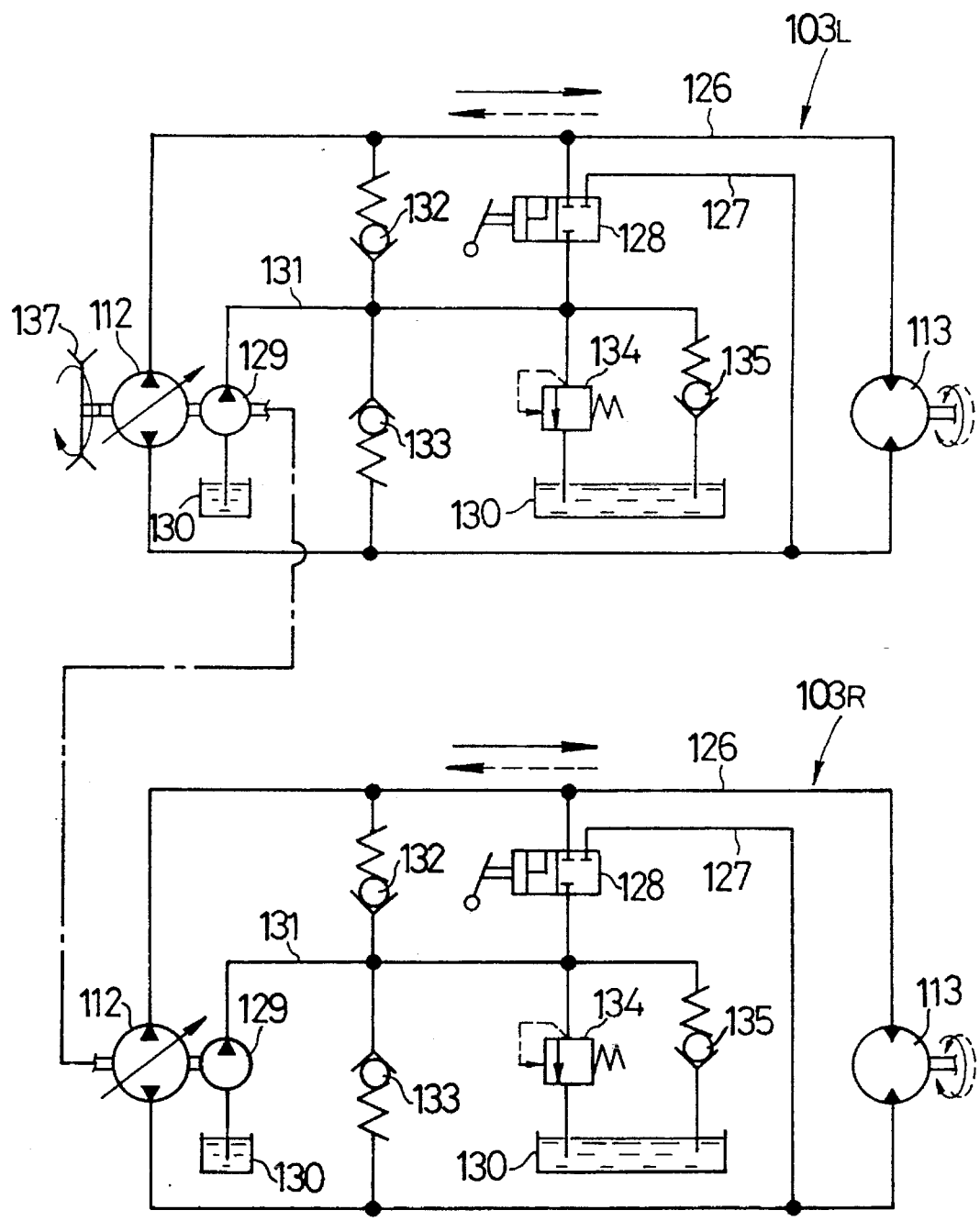
FIG. 13 is a schematic diagram of hydraulic circuits of the left and right hydrostatic pressure type continuously variable transmissions.

In each of the continuously variable transmissions $103_L$ and $103_R$, the hydraulic pump 112 and the hydraulic motor 113 are connected to each other by a hydraulic closed circuit 126, as shown in FIG. 13. A bypass passage 127 is provided in the hydraulic closed circuit 126 to connect a higher pressure side and a lower pressure side of the hydraulic closed circuit 126, and a release valve 128 is incorporated in the bypass passage 127 and opened and closed by a manual operation. A working oil supply pump 129 is connected to the hydraulic pump 112 and driven by the pump shaft 114 of the hydraulic pump 112. The working oil supply pump 129 is intended to pump a working oil from an oil reservoir 130 into an oil supply passage 131 which is connected to the higher and lower pressure sides of the hydraulic closed circuit 126 through one-way valves 132 and 133, respectively. If necessary, the oil supply passage 131 may be connected to the oil reservoir 130 through a relief valve 134 and an intake valve 135 which are disposed parallel to each other.

Thus, if the hydraulic pump 112 is driven with the pump swash plate 117 inclined in a forward direction, when the release valve 128 is in a closed state, the working oil is permitted to flow in the hydraulic closed circuit 126 in a direction indicated by a solid-line arrow, thereby causing the motor shaft 121 of the hydraulic motor 113 to be rotated in a normal direction at a shift ratio provided by the ratio between displacements of the hydraulic pump 112 and the hydraulic motor 113 at that time. Conversely, if the pump swash plate 117 is inclined in a backward direction, the working oil is permitted to flow in the hydraulic closed circuit 126 in a direction indicated by a dotted-line arrow, thereby rotating the motor shaft 121 in a reverse direction. If leakage of the oil occurs in the hydraulic closed circuit 126 during this time, the one-way valve 132 or 133, corresponding to the current lower pressure side, is opened, thereby permitting the working oil to be supplemented from the working oil supply pump 129 to the hydraulic closed circuit 126. When the pressure in the oil supply passage 131 is risen to a given value, or more, the relief valve 134 is opened to prevent an excessive rise in the pressure in the oil supply passage 131. When the higher and lower pressure sides in the hydraulic closed circuit 126 are reversed suddenly from each other, by an engine brake, and the supplement of the working oil to the lower pressure side by the working oil supply pump 129 is insufficient, the intake valve 135 can be opened to permit the oil in the oil reservoir 130 to be drawn into such lower pressure side, thereby preventing the suction of air into the hydraulic closed circuit 126.

Referring again to FIG. 10, the hydraulic closed circuit 126, the release valve 128, the working oil supply pump 129, the oil supply passage 131, the one-way valves 132 and 133, the relief valve 134, and the intake valve 135 are provided in the distributing plate 110. The hydraulic closed circuit 126, the release valve 128 and the one-way valves 132 and 133 are not shown in FIG. 10.

The oil reservoir 130 is defined between both the case halves $102_L$ and $102_R$ of the transmission case 102. An oil filter 136 is mounted inside the distributing plate 110 and immersed into the oil reservoir 130 to cover intake ports of the working oil supply pump 129 and the intake valve 135 for filtering the working oil to be supplied to the working oil supply pump 129 and the intake valve 135.

Each of the pump shafts 114 and each of the motor shafts 121 are disposed parallel to the axles $106_L$ and $106_R$. An outer end of either one of the left and right pump shafts 114 protrudes outwardly of the housing 111 and an input pulley 137 is secured to such outer end and driven by a belt from an engine (not shown). The left and right pump shafts 114, 114 are connected coaxially to each other by a joint within the narrow portion 102. On the other hand, the left and right motor shafts 121, 121 are disposed coaxially for rotation relative to each other.

Figure 11:
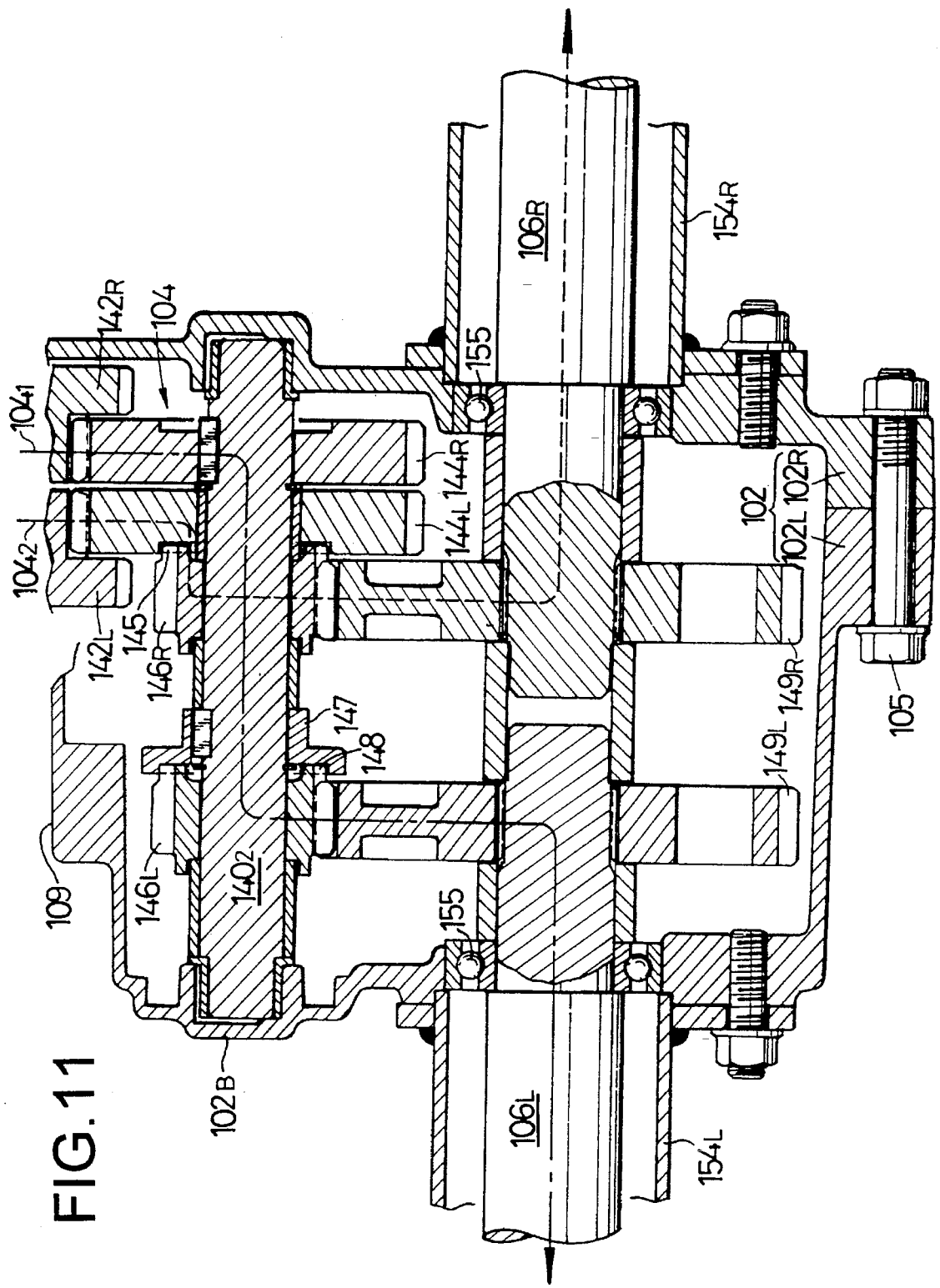
FIG. 11 is an enlarged vertical sectional view of a reducing gear mechanism shown in FIG. 8 and portions thereground.

As shown in FIGS. 10 and 11, the reducing gear mechanism 4 comprises first and second intermediate shafts $140_1$ and $140_2$ rotatably carried on the narrow and wide portions $102_A$ and $102_B$ of the transmission case 102 in parallel to the axles $106_L$ and $106_R$, respectively; a pair of left and right first small gears $141_L$ and $142_R$ secured to inner ends of the left and right motor shafts 121, 121, respectively; a pair of first large gears $142_L$ and $142_R$ rotatably carried on the first intermediate shaft $140_1$ and meshed with the first small gears $141_L$ and $141_R$; a pair of left and right second small gears $143_L$ and $143_R$ formed integrally at opposed ends of the first large gears $142_L$ and $142_R$; a right second large gear $144_R$ (or outer transmitting ring) key- or spline-coupled to a right end of the second intermediate shaft $140_2$ facing the narrow portion $102_A$ and meshed with the right second small gear $143_R$; a left second large gear (or inner transmitting ring) $144_L$ rotatably carried on the second intermediate shaft $140_2$ adjacent the left side of the right second large gear $144_R$; a right final small gear (or second final small gear) $146_R$ connected to a left end of the left second large gear $144_L$ through a dog clutch 145 and rotatably carried on the second intermediate shaft $140_2$; a clutch member 147 key- or spline-coupled to the second intermediate shaft $140_2$ on the left side of the right final small gear $146_R$; a left final small gear $146_L$ connected to a left end of the clutch member 147 through a dog clutch 148 and rotatably carried on the second intermediate shaft $140_2$; and a pair of left and right final large gears $149_L$ and $149_R$ spline-coupled to the left and right axles $106_L$ and $106_R$ and meshed with the left and right final small gears $146_L$ and $146_R$, respectively. In this reducing gear mechanism 104, the right first small gear $141_R$, the right first large gear $142_R$, the right second small gear $143_R$, the right second large gear $144_R$, the second intermediate shaft $140_2$, the clutch member 147, the left final small gear $146_L$, and the left final large gear $149_L$ form a first transmitting system $104_1$ which connects the motor shaft 121 of the right continuously variable transmission $103_R$ to the left axle $106_L$, while the left first small gear $141_L$, the left first large gear $142_L$, the left second small gear $143_L$, the left second large gear $144_L$, the right final small gear $146_R$ and the right final large gear $149_R$ form a second transmitting system $104_2$ which connects the motor shaft 121 of the left continuously variable transmission $103_L$ to the right axle $106_R$.

Figure 12:
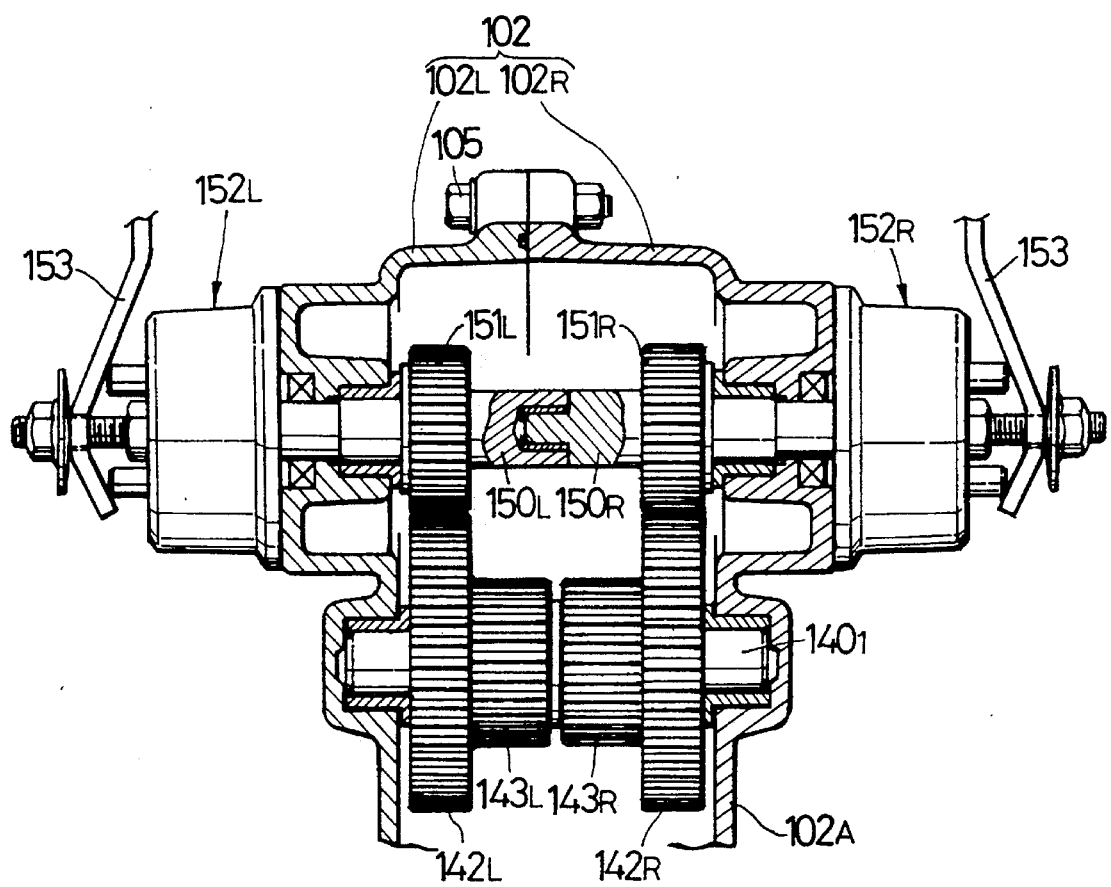
FIG. 12 is a sectional view taken along a line 12—12 is FIG. 9.

As shown in FIGS. 9 and 12, a pair of brake shafts $150_L$ and $150_R$, parallel to the first intermediate shaft $140_1$ and coaxial with each other, are relatively rotatably carried on the narrow portion $102_A$ of the transmission case 102. A pair of brake gears $151_L$ and $151_R$ are secured to the brake shafts $150_L$ and $150_R$ and are meshed with the first large gears $142_L$ and $142_R$, respectively. The left and right brake shafts $150_L$ and $150_R$ protrude laterally outwardly of the narrow portion $102_A$ and are provided with brake devices $152_L$ and $152_R$, which are operated by turning a brake lever 153.

The operation of this embodiment will be described below. Power transmitted from the engine (not shown) to the input pulley 137 is distributed to the pump shafts 114, 114 of the left and right continuously variable transmissions $103_L$ and $103_R$ and, after proper gear-shifting, are delivered from the corresponding motor shafts 121, 121 to the reducing gear mechanism 104. The power delivered from the motor shaft 121 of the right continuously variable transmission $103_R$ to the reducing gear mechanism 104 is reduced in speed at three stages by the first transmitting system $104_1$ and transmitted to the left axle $106_L$. The power delivered from the motor shaft 121 of the left continuously variable transmission $103_L$ to the reducing gear mechanism 104 is reduced in speed at three stages by the second transmitting system $104_2$ and transmitted to the right axle $106_R$. The left and right axles $106_L$ and $106_R$ drive the crawlers $108_L$ and $108_R$ through the left and right driving wheels $107_L$ and $107_R$ and, therefore, the vehicle can be moved.

In this case, if both the pump swash plates 117, 117 in the left and right continuously variable transmission $103_L$ and $103_R$ are tilted in a forward direction, both the motor shafts 121, 121 are rotated in a normal direction to move the vehicle forwardly. If both the pump swash plates 117, 117 are tilted in a backward direction, both the motor shafts 121, 121 are rotated in a reverse direction to move the vehicle backwardly.

If a difference is provided between the angles of inclination of the left and right pump swash plates 117, 117 to provide different gear-shift ratios of the left and right transmissions $103_L$ and $103_R$, a difference is produced between the rotational speeds of the left and right motor shafts 121, 121 and the vehicle is turned.

Further, if the left and right pump swash plates 117, 117 are tilted in reverse directions from each other, the left and right motor shafts 121, 121 are rotated in reverse directions and the vehicle is turned.

In such drive device 101, the transmission case 102 includes the narrow portion $102_A$ and the wide portion $102_B$, and the pair of hydrostatic pressure type continuously variable transmissions $103_L$ and $103_R$ are mounted to the left and right opposite sides of the narrow portion $102_A$. The left and right axles $106_L$ and $106_R$ are carried on the wide portion $102_B$ and, further, the dual reducing gear mechanism 104 is disposed to extend from the narrow portion $102_A$ to the wide portion $102_B$. Therefore, a dead space within the transmission case can be reduced to the utmost to construct the entire device in a compact manner.

Moreover, the step 109 between the narrow and wide portions $102_A$ and $102_B$ is provided only on the left case half 102, and the sidewall of the right case half $102_R$ is formed to be substantially flat. Therefore, a casting mold for the right case half $102_R$ is of a simple shape to, correspondingly, facilitate the fabrication thereof, thereby enabling a reduction in cost.

Further, the two transmitting systems $104_1$ and $104_2$ of the reducing gear mechanism 104 intersect each other on the second intermediate shaft $140_2$, carried at the wide portion $102_B$, so that they can be disposed to extend from the narrow portion $102_A$ to the wide portion $102_B$ to enable a multi-stage gear shifting.

It will be understood that various modifications in design to the above-described embodiments may be made without departing from the spirit and scope of the invention defined in claims. For example, wheels may be mounted to the axles $106_L$ and $106_R$ in place of the crawler drive wheels $107_L$ and $107_R$. In addition, a bevel gear may be secured to the joint 138, and a bevel gear meshed with such bevel gear may be secured to the input shaft extending through the front and rear walls of the transmission case 102, so that both the pump shafts 114, 114 can be driven by the input shaft. Further, the transmission case 102 may be disposed in a layout in which it is inclined forwardly or rearwardly around the axles $106_L$ and $106_R$, or in a tilted-down layout.

What is claimed is:

1. A drive device for a power working vehicle, comprising:

a transmission case including a wide portion for carrying left and right axles, and a narrow portion connected to the wide portion through a step, the transmission case being divided into two halves along a plane perpendicular to the axles;

a hydrostatic pressure type continuously variable transmission including a hydraulic pump and a hydraulic motor and mounted to one side of said narrow portion, such that said variable transmission is accommodated within a height of said step and a motor shaft of said hydraulic motor is parallel to said axles;

a differential means disposed on the wide portion for differentially operating said left and right axles relative to one another; and a reducing gear mechanism extending from said narrow portion to said wide portion for performing speed reduction at a plurality of stages and transmitting power from said motor shaft to said axles wherein said wide portion accommodates therein at least one intermediate shaft included in said reducing gear mechanism.

2. A drive device for a power working vehicle according to claim 1, wherein said wide portion of said transmission case accommodates any of a differential gear mechanism and a side clutch mechanism as said differential means.

3. A drive device for a power working vehicle according to claim 1, wherein said differential means is formed as a side clutch mechanism which comprises:

a transmitting ring coupled to said intermediate shaft of said reducing gear mechanism parallel to and adjacent the left and right axles and which is driven from the motor shaft of the continuously variable transmission;

a first clutch gear rotatably and slidably carried on the intermediate shaft;

a clutch plate member coupled to the intermediate shaft; and a second clutch gear rotatably and slidably carried on the intermediate shaft, wherein said transmitting ring, said first clutch gear, said clutch plate member and said second clutch gear are sequentially disposed in the named order from one end toward the other end on the intermediate shaft, wherein said clutch mechanism further comprises:
        a first dog clutch provided between said transmitting ring and said first clutch gear and brought into engaged and disengaged states in response to a reciprocal movement of said first clutch gear;
        a second dog clutch provided between said clutch plate member and said second clutch gear and brought into engaged and disengaged states in response to a reciprocal movement of said second clutch gear; and
        first and second driven gears normally meshed with said first and second clutch gears, respectively, and coupled to said left and right axles, respectively, and wherein said continuously variable transmission is disposed adjacent on one side of said side clutch mechanism where said intermediate shaft is located.

4. A drive device for a power working vehicle according to claim 3, wherein said continuously variable transmission is mounted to an outer side of said transmission case which accommodates said reducing gear mechanism.

5. A drive device for a power working vehicle, comprising:

a pair of left and right hydrostatic pressure type continuously variable transmissions, with pump shafts connected to each other; and a reducing gear mechanism having two transmitting systems for individually performing speed reduction and transmitting outputs from motor shafts of said continuously variable transmissions to left and right axles, wherein said drive device further includes a transmission case constructed from a first case half having a flat outer side and a second case half connected to said first case half and having an outer side including a step, said transmission case including a narrow portion and a wide portion bounded by said step, wherein said left and right transmissions are mounted to opposite outer sides of said narrow portion, said pump shafts of said left and right transmissions being connected to each other within said narrow portion, wherein said left and right axles and an intermediate shaft are carried on opposite sidewalls of said wide portion, said intermediate shaft being parallel to and adjacent one side of each of said left and right axles, wherein said reducing gear mechanism comprises first and second transmitting systems, said first transmitting system comprising:
  said intermediate shaft;
  an outer transmitting ring secured to said intermediate shaft to face the narrow portion and driven in a speed-reduction manner from the motor shaft of one of the continuously variable transmissions;
  a first final small gear connected to the intermediate shaft; and
  a first final large gear secured to one of the axles, and meshed with the first final small gear, and wherein said second transmitting system comprises:
  an inner transmitting ring rotatably carried on the intermediate shaft adjacent an inner side of the outer transmitting ring, said inner transmitting ring facing said narrow portion and driven in a speed-reduction manner from said motor shaft of the other continuously variable transmission;
  a second final small gear rotatably carried on the intermediate shaft and connected to the inner transmitting ring; and
  a second final large gear fixedly mounted on the other axle and meshed with the second final small gear.

6. A drive device for a power working vehicle according to claim 5, wherein said two transmitting systems of said reducing gear mechanism are arranged to intersect each other on said intermediate shaft.

* * * * *